April 6, 1926.

A. TERESA

TIRE

Filed Nov. 6, 1923

1,579,674

WITNESSES

W. A. Williams

J. G. Quesada

INVENTOR

Antonio Teresa

BY

ATTORNEYS

Patented Apr. 6, 1926.

1,579,674

UNITED STATES PATENT OFFICE.

ANTONIO TERESA, OF HABANA, CUBA.

TIRE.

Application filed November 6, 1923. Serial No. 673,142.

*To all whom it may concern:*

Be it known that I, ANTONIO TERESA, a subject of the King of Spain, and resident of Habana, in the Province of Habana, Cuba, have invented certain new and useful Improvements in Tires, of which the following is a specification.

This invention relates to tires for vehicle wheels and more particularly to those of the pneumatic type.

Briefly stated an important object of this invention is to provide a vehicle wheel with a tire comprising a plurality of separate and independent inflatable sections, any one of which may be renewed or repaired without disturbing the other sections and without removing the wheel from engagement with the ground.

A further object is to provide a pneumatic tire wherein means is provided to sustain the tire should one or more of the inflatable sections be punctured whereby the repair of the punctured section may be delayed until convenient.

Also one of the principal objects of the invention is to provide a tire which may be repaired without the exercise of unusual skill and which is practically blowout proof.

A further object is to provide a tire which is capable of long wear, which is neat in appearance and cheap to manufacture.

Other objects and advantages will be apparent during the course of the following description.

Figure 1:
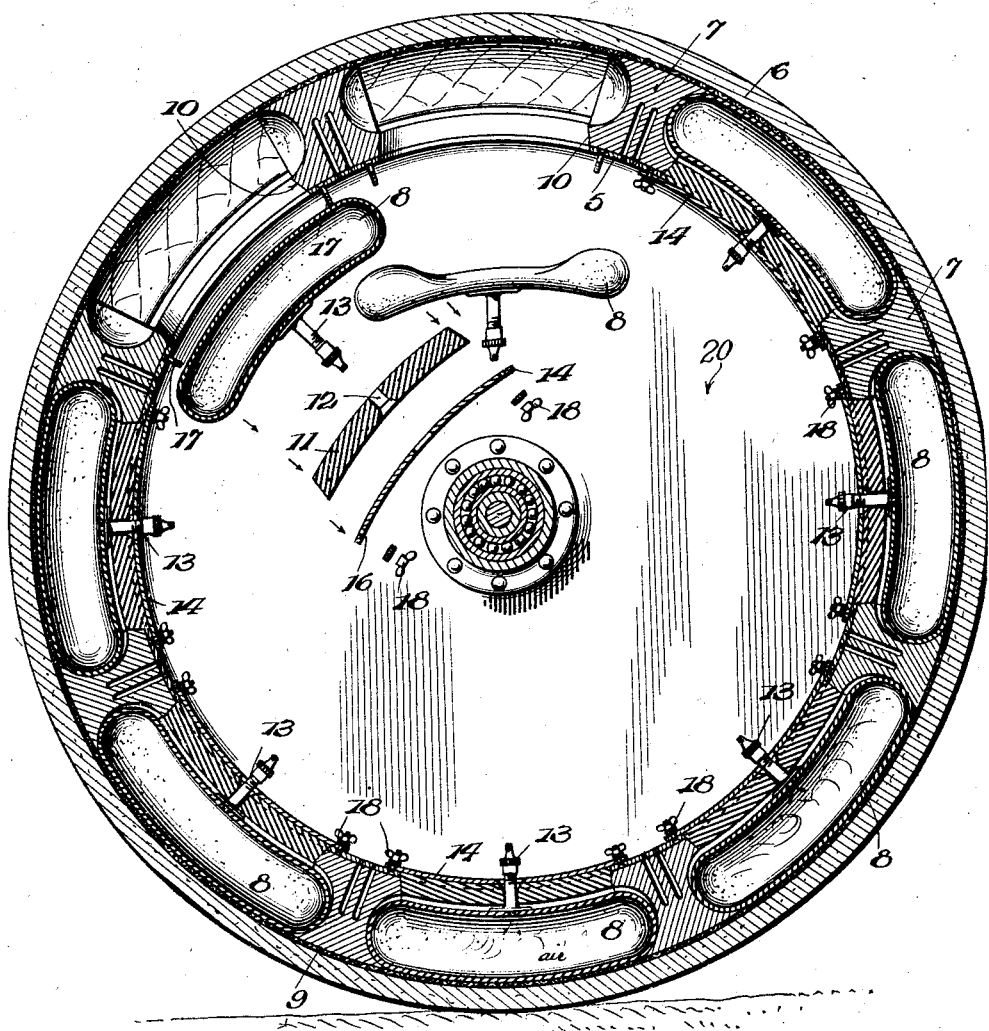
Figure 2:
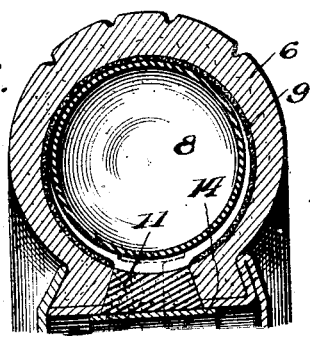

In the accompanying drawing forming a part of this application and in which like numerals are employed to designate like parts throughout the same, Figure 1 is a vertical sectional view through the improved tire, applied, Figure 2 is an enlarged detail transverse sectional view through the improved tire.

In the drawing wherein for the purpose of illustration is shown a preferred embodiment of the invention, the numeral 5 designates a rim about which a casing or shoe 6 of the usual construction is arranged.

Figure 1 shows a plurality of end blocks 7 arranged in spaced relation about the rim 5 and defining a plurality of cells for the reception of inflatable arcuate tube sections 8. This figure also illustrates that the opposite ends of the end blocks 7 are formed with approximately semi-spherical recesses for the reception of the rounded ends of the inflatable tube sections 8. By reason of this construction, the tubes when properly inflated will completely fill the cells formed by the end blocks 7 and the fabric cover 9.

In manufacture the end blocks 7 are arranged in a jig and the fabric cover 9 is then securely wrapped about and attached to the end blocks 7 so as to maintain the blocks in spaced relation at all times.

Attention is directed to the fact that the opposed inner portions of the end blocks 7 are beveled or inclined as indicated at 10 to define tapered pockets for the reception of rubber filler or spacer plates 11. The plates 11 are formed with openings 12 for the reception of the valve stems 13 of the several sections and by reference to Figure 1 it will be see that each filler plate is securely and positively held in position by a cover strip 14 of metal or other suitable material. The ends of the metal cover strips are formed with apertures 16 for the reception of stud bolts 17 by means of which the cover strips may be held in position. Wing nuts 18 are threaded on the stud bolts 17 and may be quickly detached without the aid of a wrench or other tool when it is desired to gain access to one of the tubes. However the stems 13 extend through the metal cover strips so that the tubes may be individually inflated without detaching the cover strips.

The numeral 20 designates a detachable disk secured at its periphery to the rim 5 by suitable fastening devices and it might be stated that the rim is permanently carried by an inner disk and has detachable connection with the outer disk. By reason of this construction the inner and outer disks effectively conceal the wing nuts and other fastening devices and also protect the parts from dust.

In use the several tube sections are separately inflated to about 65 pounds pressure, and the disk 20 is applied so as to conceal the valve stems, the wing nuts and the like. If one or more of the sections are punctured the remaining sections and the filler blocks or end blocks 7 will sustain the wheel until such time as it is possible or convenient to make the necessary repair. The collapse of only one section will not noticeably impair the riding qualities of the vehicle or damage the wheel. Of course the end sections may be of rubber or other yieldable material of sufficient strength to support the load without yielding to an unnecessary extent.

When it is desired to renew or repair one of the pneumatic sections it is merely necessary to turn the wheel until the punctured section is positioned a proper distance above the ground. The employment of a jack or other lifting means is unnecessary. The strip 14 and the plate 11 may be removed and the damaged pneumatic section is then removed and the necessary repair made. It is believed to be obvious that after the repaired section has been reinserted in the proper cell the members 11 and 14 are again applied.

Attention is specially directed to the fact that the removal of one section will not in anyway disturb the other sections, as all the end blocks are held against circumferential movement by the fabric covering 9.

Also the air pressure within the tubes is insufficient to cause a blow-out, even if the tire is at any time subjected to a substantial strain or an abnormal strain.

A tire constructed in accordance with this invention permits the case to wear entirely through so that the cost of maintenance is reduced to a minimum.

Having thus described the invention, what is claimed is:

A tire comprising a casing, an annular series of spaced yieldable end blocks having recesses, and separate pneumatic tube sections confined between said blocks and having rounded ends received in said recesses, and a covering surrounding said end blocks and said pneumatic tube sections and being permanently connected to said end blocks whereby to maintain the blocks in spaced relation.

ANTONIO TERESA.